(12) United States Patent
Mcinally

(10) Patent No.: US 10,876,361 B2
(45) Date of Patent: Dec. 29, 2020

(54) HIGH TENSILE STRENGTH WINDER CONNECTION FOR DOWNHOLE TOOLS

(71) Applicant: Altus Intervention (Technologies) AS, Stavanger (NO)

(72) Inventor: Gerald Mcinally, Bryne (NO)

(73) Assignee: Altus Intervention (Technologies) AS, Stavanger (NO)

( * ) Notice: Subject to any disclaimer, the term of this patent is extended or adjusted under 35 U.S.C. 154(b) by 0 days.

(21) Appl. No.: 16/464,131

(22) PCT Filed: Jan. 11, 2018

(86) PCT No.: PCT/NO2018/050008
§ 371 (c)(1),
(2) Date: May 24, 2019

(87) PCT Pub. No.: WO2018/135951
PCT Pub. Date: Jul. 26, 2018

(65) Prior Publication Data
US 2019/0368280 A1 Dec. 5, 2019

(30) Foreign Application Priority Data
Jan. 19, 2017 (NO) .................................. 20170089

(51) Int. Cl.
*E21B 17/00* (2006.01)
*E21B 17/042* (2006.01)
(Continued)

(52) U.S. Cl.
CPC .......... *E21B 17/003* (2013.01); *E21B 17/023* (2013.01); *E21B 17/042* (2013.01);
(Continued)

(58) Field of Classification Search
CPC .. E21B 17/003; E21B 17/042; E21B 33/0385; F16L 15/00; F16L 27/05;
(Continued)

(56) References Cited

U.S. PATENT DOCUMENTS 3,674,292 A * 7/1972 Demler, Sr. ........... F16L 13/146
285/148.18
3,778,089 A 12/1973 Fredd
(Continued)

FOREIGN PATENT DOCUMENTS

| EP | 0060549 A1 | 3/1982 |
|---|---|---|
| WO | 2005035930 A2 | 4/2005 |
| WO | 2016014261 A1 | 1/2016 |

*Primary Examiner* — David Carroll
(74) *Attorney, Agent, or Firm* — Gable Gotwals

(57) ABSTRACT

A winder for a threaded connection of two axially aligned bodies where a first body comprises a male portion at an end connection portion and a second body has a female portion at an end connection portion. The female portion comprises a sleeve with a threaded portion on an internal face. The winder includes a winder ring encircling the male portion. The winder ring forms an internal surface and an external surface having a threaded portion. The internal surface of the winder ring includes a number of parallel grooves that are perpendicular to a rotational axis of the winder ring. A further male portion comprises external, circular grooves complementary to internal, circular ridges of the winder, and a threaded connection between two axially aligned bodies where the connection comprises the winder and the male portion.

9 Claims, 6 Drawing Sheets

(51) Int. Cl.
  *E21B 33/038* (2006.01)
  *E21B 17/02* (2006.01)
  *F16L 15/00* (2006.01)
  *F16L 27/08* (2006.01)
  *F16L 39/04* (2006.01)

(52) U.S. Cl.
  CPC ........... *E21B 33/0385* (2013.01); *F16L 15/00* (2013.01); *F16L 27/08* (2013.01); *F16L 39/04* (2013.01)

(58) Field of Classification Search
  CPC . F16L 39/04; F16L 17/08; F16L 13/16; F16L 19/02; F16L 19/023116; F16L 21/06
  USPC ........................................................ 285/387
  See application file for complete search history.

(56) References Cited

U.S. PATENT DOCUMENTS

| | | | |
|---|---|---|---|
| 5,547,229 A * | 8/1996 | Eidsmore | F16L 19/025 285/328 |
| 8,029,026 B2 | 10/2011 | Stolle et al. | |
| 2004/0108721 A1 | 6/2004 | Olson | |
| 2005/0099008 A1 | 5/2005 | Glover | |
| 2015/0285008 A1* | 10/2015 | Chan | E21B 33/0385 166/242.6 |
| 2017/0122072 A1* | 5/2017 | Leiper | E21B 17/006 |

\* cited by examiner

HIGH TENSILE STRENGTH WINDER CONNECTION FOR DOWNHOLE TOOLS

CROSS-REFERENCE TO RELATED APPLICATIONS

This United States application is the National Phase of PCT Application No. PCT/NO2018/050008 filed 11 Jan. 2018, which claims priority to Norwegian Patent Application No. 20170089 filed 19 Jan. 2017, each of which is incorporated herein by reference.

This invention relates to a winder for connecting two axially aligned bodies by a threaded connection. The threaded connection comprises a male part and a female part. The male part is provided with the winder and the female part comprises a sleeve with internal threads. The internal threads are complementary to external threads of the winder. More specifically, the winder is a split winder. Even more specifically the winder of the invention is provided with a plurality of internal circular and parallel grooves and ridges that fit into a plurality of external circular and parallel grooves and ridges on the end portion of the male part. Thereby a tensile force between the two bodies are distributed over a plurality of ridges on the male part and the winder.

Threaded connections are regularly used in the oilfield for connecting downhole equipment together.

A common challenge for equipment used in oil wells is that they have strict limitations on the outside diameter (OD) of the equipment. The threaded connections must be as strong as possible to allow the equipment to handle high tensile and compressive loads so that it safely withstands the demands of running in, performing operations and pulling out. This is even more important if the equipment gets stuck downhole in the oil well which means a so-called 'fishing' operation may be required.

In addition, it is common for downhole well intervention equipment that the connections between the equipment also include hydraulic passages and electrical connectors to enable the functionality. This means that the equipment cannot be connected with a standard simple threaded pipe connection where one piece is rotated into the other. In such cases, threaded winder connections have to be used. Patent document WO 2005035930/U.S. Pat. No. 8,029,026 discloses a winder of this kind. A first component is provided with external threads on a connection end abutting a mating face of the first component. A second component is provided with external threads on a connection end abutting a mating face of the second component. A connection sleeve is smooth on an external face and threaded on a portion of the internal face. The connection sleeve is threaded onto the first component. The internal free end of the connection sleeve is without threads. In the make-up process, the first and second component are positioned such that openings, channels and nipples in the first component are axially aligned with the corresponding openings, channels and nipple recipients in the second component. The second component is mated flush with the first component such that there is no gap between the two mating faces. The connection sleeve is then threaded across the mating face onto the second component.

Alternative winder connections according to prior art are shown in FIGS. 1-3.

Compared to the winder disclosed in patent document WO 2005035930/U.S. Pat. No. 8,029,026, the winders shown in FIGS. 1-3 offer several advantages. Only one of the bodies form a male portion provided with external threads. Thereby the problem of precise entrance of the threads is avoided when the first body and the second body are abutting. The winder is provided with a winder collar of larger material thickness. A hole or several holes for a key are located in the winder collar and the thickness of the winder collar allows the winder to be tightened with a force without deforming the winder.

As explained above, the first body and the second body may experience tensile forces F, F', see FIGS. 2-3. An inspection of FIGS. 1-3 reveals that there are two structures in the male-female coupling that withstand the tensile forces:

- a connection between the external threads of a winder ring and the internal threads of a female sleeve; and
- a shoulder portion of a groove at the free end of a male portion which supports a split winder ring (FIGS. 1-2) or a split retainer ring (FIG. 3).

Due to the axial length of the threaded area, high tensile loads can be supported by the threads. However, as the winder ring is slidable on the male portion, all tensile loads will be supported by the shoulder portion via the split winder ring or retainer ring. As clearest shown in the lower part of FIG. 3, material thickness in portions of the male portion is limited due to channels, and the groove is therefore of shallow depth. The limited height of the shoulder portion is critical to the tensile load it can withstand. This significantly reduces the ability of the equipment to survive undamaged with high tensile loads, which might be encountered in stuck tool or fishing operations.

The invention has for its object to remedy or to reduce at least one of the drawbacks of the prior art, or at least provide a useful alternative to prior art.

The object is achieved through features, which are specified in the description below and in the claims that follow.

The current invention provides an alternative solution to the existing challenges and significantly increased strength threaded winder connection for downhole well intervention equipment.

In a first aspect the invention relates more particularly to a winder for a threaded connection of two axially aligned bodies where:
- a first body comprises a male portion at an end connection portion;
- a second body comprises a female portion at an end connection portion;
- the female portion comprises a sleeve with a threaded portion on an internal face;
- the winder comprises a winder ring encircling the male portion; and
- the winder ring forms an internal surface and an external surface, and the external surface comprises a threaded portion, and where
- the winder ring's internal surface comprises a number of parallel grooves that are perpendicular to a rotational axis of the winder ring.

The winder ring may be formed by two or more segments, e.g. three or four segments. The winder may further comprise a winder collar. The winder ring and the winder collar may be permanently fixed together. In an alternative embodiment, the winder collar may be releasably joined to the winder ring.

The internal grooves and ridges of the winder are circular.

In a second aspect the invention relates more particularly to a male portion at the end connection portion of a first body, where the male portion is adapted to be mated with a female portion at the end connection of a second body, where:

the female portion comprises a sleeve with a threaded portion on an internal face; and a winder comprises a winder ring; the winder ring forms an internal surface and an external surface, and the external surface comprises a threaded portion, and the winder ring encircles the male portion, and where the male portion at an outer surface comprises a number of parallel grooves that are perpendicular to a longitudinal axis of the first body.

The parallel grooves form between them parallel ridges on the outer surface of the male portion. The grooves and ridges are circular.

The male portion may have an outer diameter (OD) that is less than the outer diameter (OD) of the first body.

In a third aspect the invention relates more particularly to a threaded connection between two axially aligned bodies comprising:

a first body which comprises a male portion at an end connection portion;

a second body which comprises a female portion at an end connection portion, the female portion comprises a sleeve with a threaded portion on an internal face;

a winder comprises a winder ring encircling the male portion, the winder ring forms an internal surface and an external surface, and the external surface comprises a threaded portion, and where the winder ring's internal surface comprises a number of parallel ridges that are perpendicular to a rotational axis of the winder ring; and the male portion at an outer surface comprises a number of parallel grooves that are perpendicular to a longitudinal axis of the first body, and the winder ring's ridges mate with the male portion's grooves.

The winder ring of the threaded connection may be formed by two or more segments, e.g. three or four segments. The winder may further comprise a winder collar. The winder ring and the winder collar may be permanently fixed together. In an alternative embodiment, the winder collar may be releasably joined to the winder ring.

In the following is described examples of preferred embodiments illustrated in the accompanying drawings, wherein.

Figure 1:
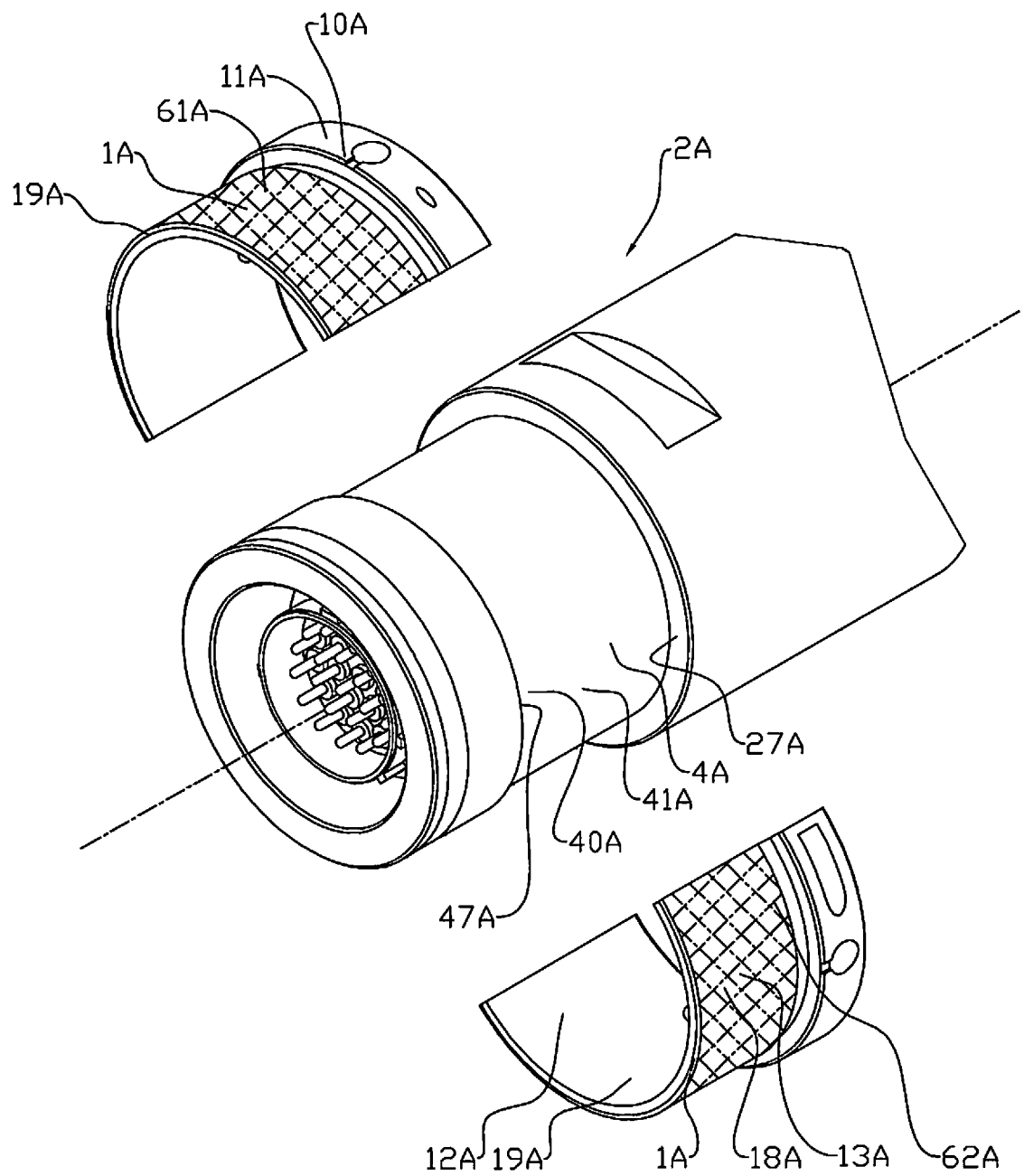
FIG. 1 shows a winder for an electrical connector in an exploded view according to prior art.
Figure 2:
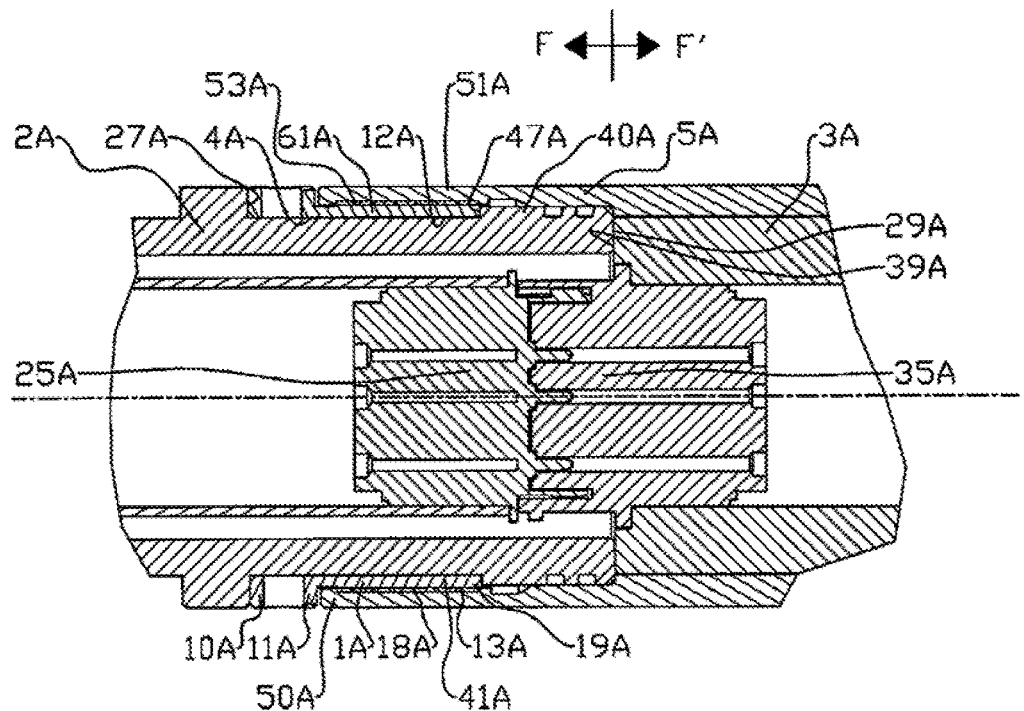
FIG. 2 shows a sectional drawing of the winder shown in FIG. 1.

In FIG. 1, the reference numeral 1A indicates a winder for an electrical connector as known in prior art. The shown winder 1A is a split winder comprising a first segment 61A and a second segment 62A. The winder 1A is used to connect two stationary bodies 2A and 3A together by a threaded connection, as shown in FIG. 2. The two bodies 2A, 3A have the same OD. The winder 1A is rotated and this screws the first body 2A into the second body 3A while keeping all electrical connections 25A in the first body 2A aligned with the respective electrical connections 35A in the second body 3A. This type of winder connection will be very strong in supporting compressive loads where the first body 2A presses against the second body 3A.

The end portion of the first body 2A forms a shoulder 27A and a cylindrical male portion 4A. A cylindrical face 41A on the male portion 4A is smooth and forms a sliding surface between the winder 1A and the male portion 4A. The winder 1A forms a sleeve with a first end portion 10A and a second end portion 19A. The first end portion 10A abuts the shoulder 27A. The first end portion 10A is provided with a winder collar 11A such that the OD of the first end portion 10A corresponds with the OD of the first body 2A.

The male portion 4A is at a free end portion 40A provided with a circular shoulder 47A. An axial distance between the shoulder 27A and the shoulder 47A corresponds substantially to the length of the winder 1A. An internal face 12A of the winder 1A is smooth. The winder 1A can freely rotate around the male portion 4A. The winder's 1A axial position is fixed by the shoulders 27A and 47A.

The winder 1A is on an outer face 18A provided with external threads 13A at the second end portion 19A. The external threads 13A have an OD that is less than the OD of the first body 2A. The external threads 13A are shown schematically in FIG. 1.

The end portion of the second body 3A forms a female portion 5A with a fixed sleeve 51A. The sleeve 51A is complementary to the male portion 4A inclusive the winder's 1A second end portion 19A. The sleeve's 51A free end portion 50A is provided with a smooth internal face. The sleeve 51A is in a middle portion provided with internal threads 53A.

The make-up process is initiated by axially aligning the first body 2A and the second body 3A. The second body 2A is mated with the second body 3A such that the male portion 4A enters the female portion 5A until the external threads 13A abut the internal threads 53A. The winder 1A is rotated and the external threads 13A engage the internal threads 53A. The winder 1A is rotated until a mating face 29A of the male portion 4A abuts a mating face 39A of the female portion 5A.

Figure 3:
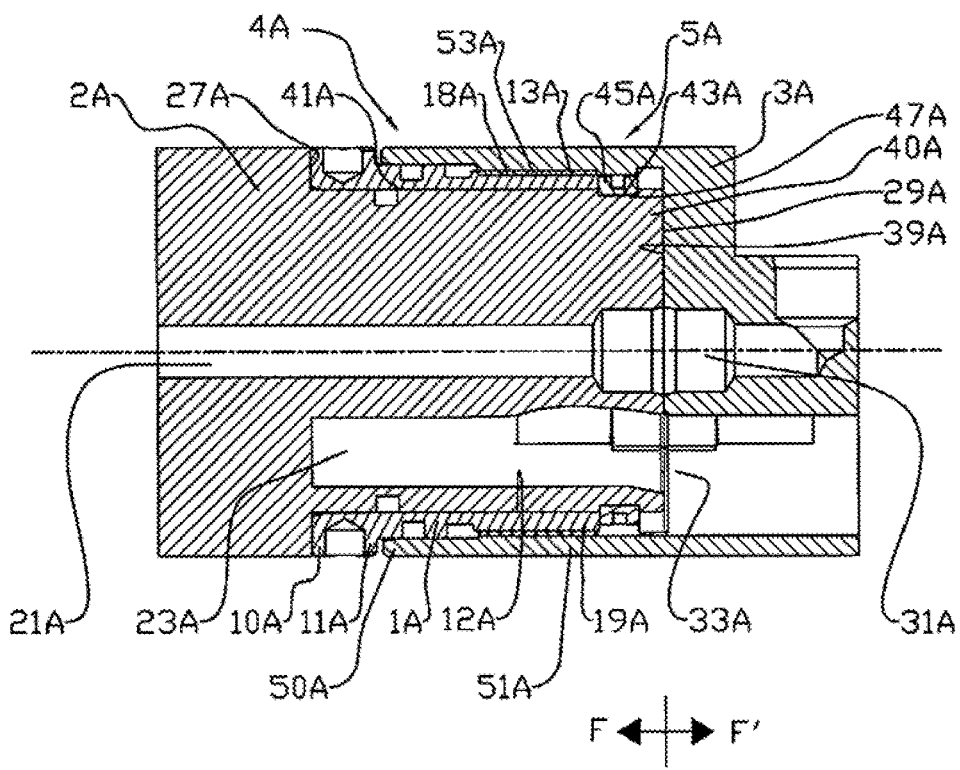
FIG. 3 shows in the same scale as FIG. 2 a sectional drawing of a winder for a hydraulic connector according to prior art.

FIG. 3 shows a winder for hydraulic connections as known in prior art. The winder 1A is used to connect two stationary bodies 2A and 3A together by a threaded connection. The two bodies 2A, 3A are shown with the same OD. The winder 1A is rotated and this screws the first body 2A into the second body 3A while keeping all hydraulic connections 21A and 23A in the first body 2A aligned with the respective hydraulic connection 31A and 33A in the second body 3A. This type of winder connection will be very strong in supporting compressive loads where the first body 2A presses against the second body 3A.

The end portion of the first body 2A forms a shoulder 27A and a cylindrical male portion 4A. A cylindrical face 41A on the male portion 4A is smooth and forms a sliding surface between the winder 1A and the male portion 4A. The winder 1A forms a sleeve with a first end portion 10A and a second end portion 19A. The first end portion 10A abuts the shoulder 27A. The first end portion 10A is provided with a winder collar 11A such that the OD of the first end portion 10A corresponds with the OD of the first body 2A.

The male portion 4A is at a free end portion 40A provided with a circular groove 43A forming a shoulder 47A. A split retainer ring 45A is positioned in the groove 43A. An axial distance between the shoulder 27A and the retainer ring 45A corresponds substantially to the length of the winder 1A. An internal face 12A of the winder 1A is smooth. The winder 1A can freely rotate around the male portion 4A. The winder's 1A axial position is fixed by the shoulder 27A and the retainer ring 45A.

The winder 1A is on an outer face 18A provided with external threads 13A at the second end portion 19A. The external threads 13A are shown with an OD that is less than the OD of the first body 2A.

The end portion of the second body 3A forms a female portion 5A with a fixed sleeve 51A. The sleeve 51A is complementary to the male portion 4A inclusive the winder's 1A second end portion 19A. The sleeve's 51A free end portion 50A is provided with a smooth internal face. The sleeve 51A is in a middle portion provided with internal threads 53A.

The make-up process is initiated by axially aligning the first body 2A and the second body 3A. The second body 2A is mated with the second body 3A such that the male portion 4A enters the female portion 5A until the external threads 13A abut the internal threads 53A. The winder 1A is rotated and the external threads 13A engage the internal threads 53A. The winder 1A is rotated until a mating face 29A of the male portion 4A abuts a mating face 39A of the female portion 5A.

It can be seen that the connection as described above will be very strong in compression from 2A to 3A, however tensile loads between 2A and 3A will be supported only by the small shoulder 47A in the groove 43A, which is considerably weaker. This is a significant limitation in the design of the prior art.

Figure 4:
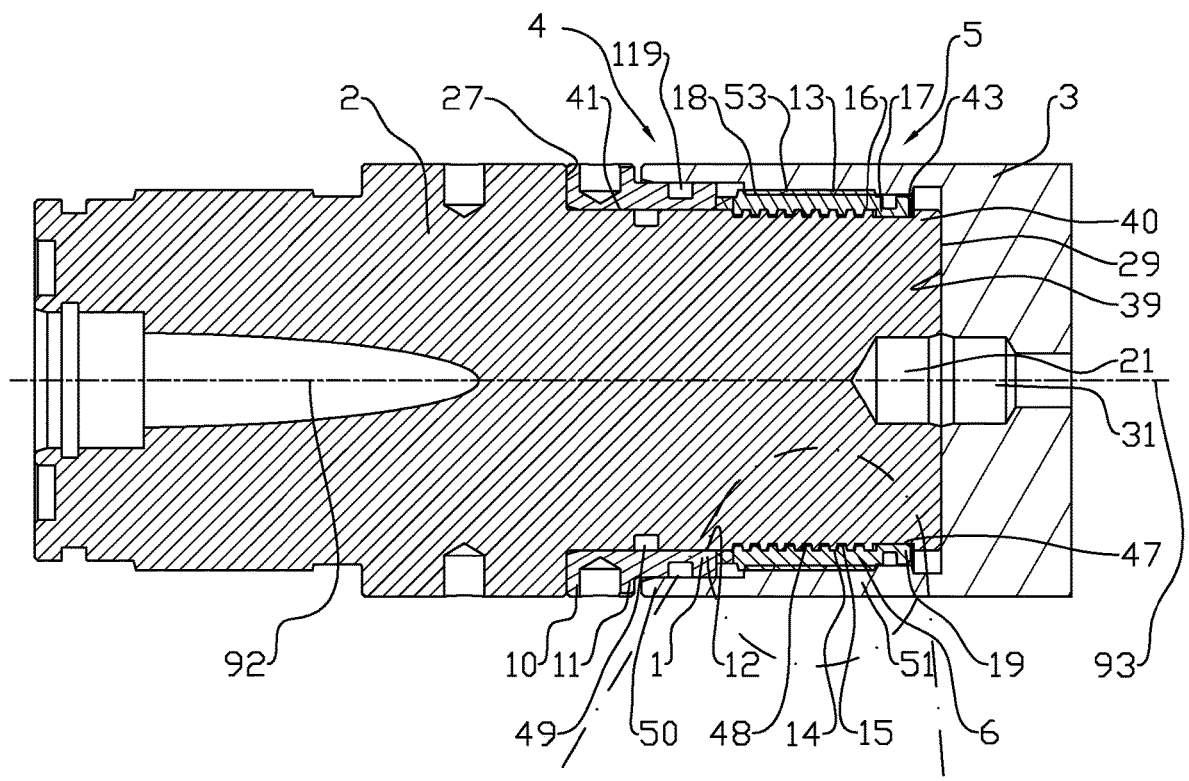
FIG. 4 shows in the same scale as FIG. 2, a winder according to the invention, and an enlarged portion of the winder.
Figure 4:
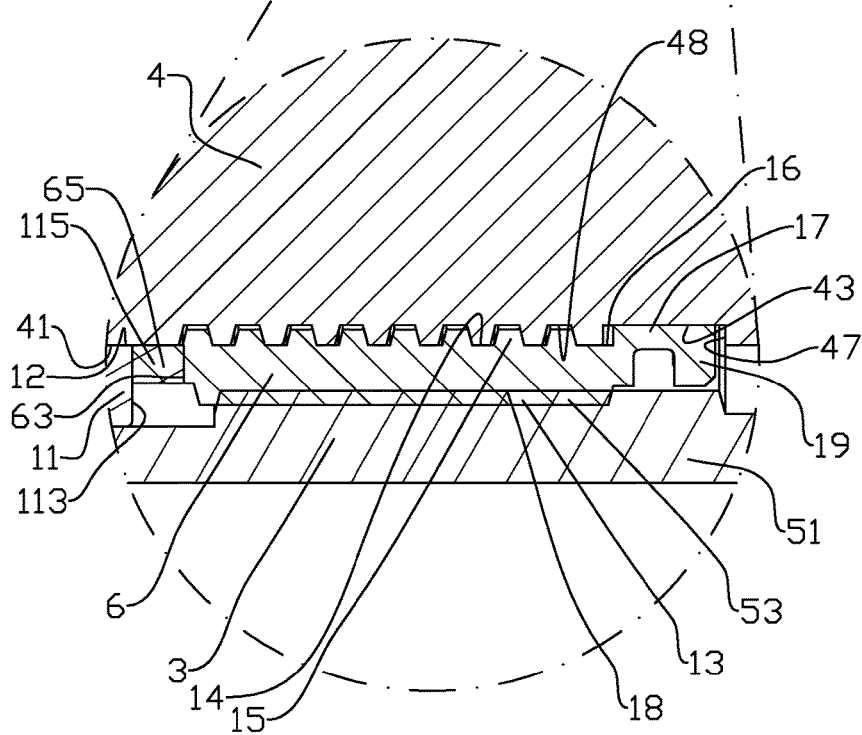
Figure 5:
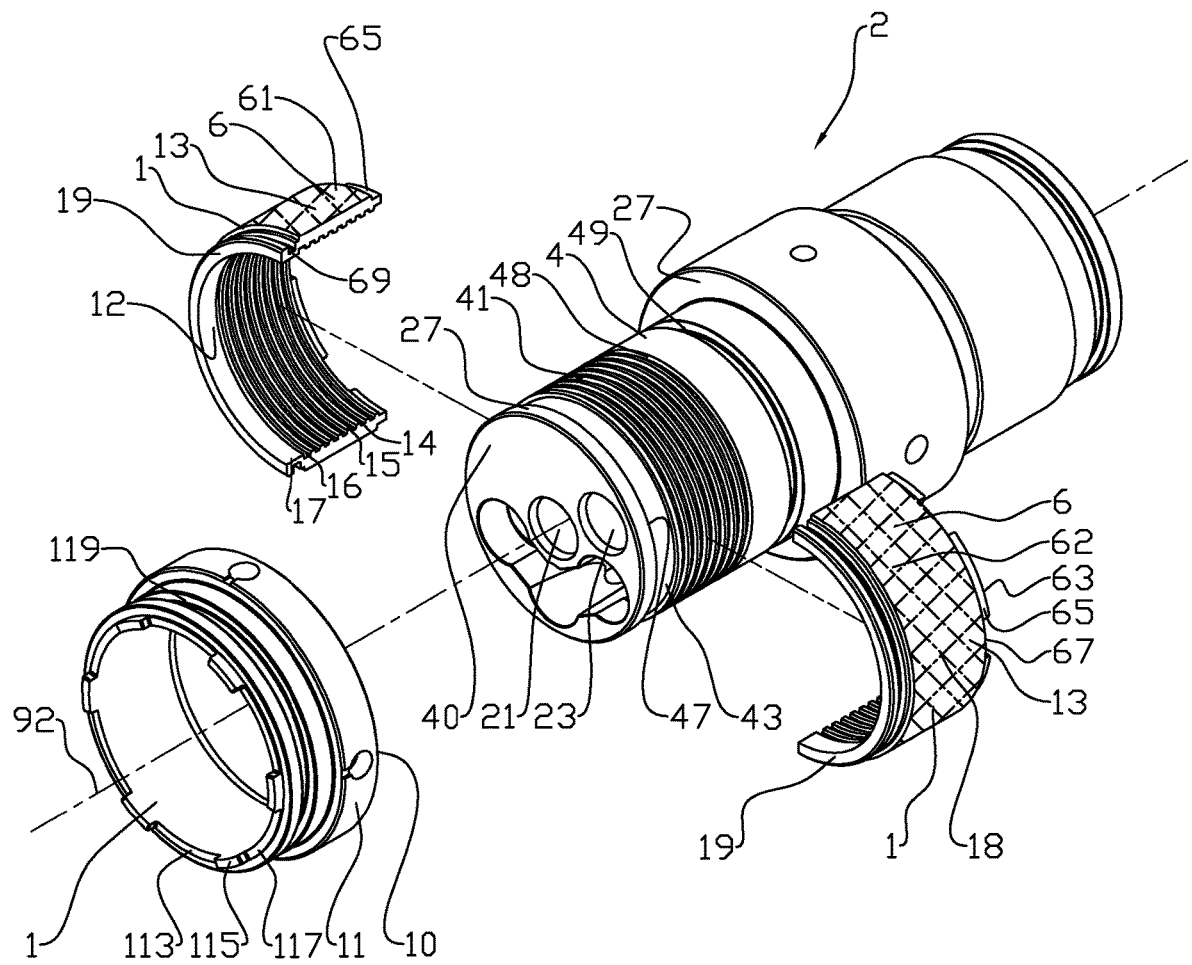
FIG. 5 shows in a different scale an exploded view and from a different direction the winder shown in FIG. 4.

A winder 1 according to a first embodiment of the invention is shown in FIGS. 4 and 5.

The winder 1 comprises a winder collar 11 and a winder ring 6. The winder ring 6, as shown in FIG. 5, comprises two identical half segments 61 and 62. The winder ring 6 may in embodiments not shown, comprise more than two segments, such as three or four segments. The segments may be of different radial size.

The winder 1 is used to connect two stationary bodies 2, 3 together. The two bodies 2, 3 are shown with the same OD. However, an OD of a first body 2 may be different from an OD of a second body 3. The winder 1 is rotated and this screws the first body 2 into the second body 3 while keeping all hydraulic connection 21 and electrical connections (not shown in FIG. 4) in the first body 2 aligned with the respective hydraulic connection 31 and electrical connections (not shown) in the second body 3. This type of winder connection will be very strong in supporting compressive loads where the first body 2 presses against the second body 3.

The end portion of the first body 2 forms a shoulder 27 and a cylindrical male portion 4. The winder 1 forms a sleeve with a first end portion 10 and a second end portion 19. The first end portion 10 abuts the shoulder 27. The first end portion 10 is provided with the winder collar 11. An OD of the first end portion 10 may correspond with the OD of the first body 2.

The winder ring 6 comprises a portion of the winder 1 between the winder collar 11 and the end portion 19.

The male portion 4 is at a free end portion 40 shown provided with a circular groove 43 in the cylindrical face 41. The groove 43 forms a shoulder 47. The male portion 4 is further provided with a number of circular, parallel grooves 48 in the cylindrical face 41 between the free end portion 40 and the shoulder 27. In FIG. 4, eight such grooves 48 are shown. Each groove 48 is shown as a tapered groove 48. The grooves 48 may in alternative embodiments be of a V-shape or be of a square shape. In an alternative embodiment (not shown) the male portion 4 is provided without the circular groove 43 and the shoulder 47.

An internal face 12 of the winder ring 6 is provided with a number of internal, circular, parallel grooves 14 that between them forms a number of internal, circular, parallel ridges 15. The ridges 15 are complementary to the grooves 48 of the male portion 4. A height of the ridges 15 is smaller than a depth of the grooves 48. At the end portion 19 the internal face 12 is provided with a terminal groove 16 and a terminal ridge 17. The terminal ridge 17 is complementary to the groove 43. The winder 1 can freely rotate around the male portion 4 as the grooves 14 and ridges 15 are parallel and perpendicular to the axis 92 of the first body 2 and the axis 93 of the second body 3.

The winder ring 6 is on an outer face 18 provided with external threads 13 at the second end portion 19. The external threads 13 are shown with an OD that is less than the OD of the first body 2. The external threads 13 are shown schematically in FIGS. 5 and 6. In an alternative embodiment (not shown), the OD of the external threads are equal to the OD of the first body 2. In a further alternative embodiment, the OD of the external threads are larger than the OD of the first body 2. In these alternative embodiments, there is no shoulder 27 at the end portion of the first body 2.

The end portion of the second body 3 forms a female portion 5 with a fixed sleeve 51. The sleeve 51 is complementary to the male portion 4 inclusive the winder's 1 second end portion 19. The sleeve's 51 free end portion 50 is provided with a smooth internal face. The sleeve 51 is in a middle portion provided with internal threads 53.

The make-up process is initiated by axially alignment of the first body 2 and the second body 3. The first body 2 is mated with the second body 3 such that the male portion 4 enters the female portion 5 until the external threads 13 abut the internal threads 53. The winder 1 is then rotated and the external threads 13 engage the internal threads 53. The winder 1 is further rotated until a mating face 29 of the male portion 4 abuts a mating face 39 of the female portion 5.

As seen in the enlarged portion of FIG. 4, the depth of the grooves 48 are similar to the height of the shoulder 47. A tensile load is distributed over the ridges between the grooves 48. In the shown embodiment there is eight grooves 48. Instead of the tensile forces being supported by just one small shoulder 47A as in the prior art shown in FIG. 3, the new connection has a multitude of supporting shoulders, making the connection many times stronger, eight times as shown in FIG. 4, and of the same level of tensile performance as the external threaded connection 13, 53, and despite the fact that the connection takes up no more valuable space than the prior art.

The winder 1 shown in FIG. 4 is shown in an exploded view and from a different direction in FIG. 5. FIG. 5 shows that the winder 1 in this embodiment comprises the winder collar 11 and the winder ring 6. The winder ring 6 is split axially into two identical half segments 61 and 62. Each half segment 61, 62 spans 180°. The half segments 61, 62 are on the rim 63 facing the winder collar 11 provided with axially oriented cams 65. The cams 65 forms between them cam pockets 67. The winder ring 6 may comprise more than two segments 61, 62, such as three or four segments. The segments may not be identical as long as they together span 360°.

The winder collar 11 forms a rim 113 facing the winder ring 6. The rim 113 is provided with axially oriented cams 115. The cams 115 forms between them cam pockets 117. The cam 65 of the winder ring 6 is complementary to the cam pocket 117 of the winder collar 11. In the same manner, the cam 115 of the winder collar 11 is complementary to the cam pocket 67 of the winder ring 6. In use, the cams 65 are positioned in the cam pockets 117 and the cams 115 are positioned in the cam pockets 67. Thereby a rotation of the winder collar 11 brings about a rotation of the winder ring 6.

The two half segments 61, 62 may in one embodiment be hold together by screws (not shown) in tangential directed screw holes (not shown) in the two half segments 61, 62. In an alternative embodiment the two half segments are held together by a retainer ring (not shown). The retainer ring is positioned in a retainer groove 69 at the second end 19. The retainer ring may be of many forms for example spring loaded steel or a rubber ring.

The cylindrical face 41 is provided with an internal sealing groove 49 at the shoulder 27. The internal sealing groove 49 houses a sealing member (not shown) between the cylindrical face 41 and the internal face 12 of the winder collar 11. The winder collar 11 is provided with an external sealing groove 119. The external sealing groove 119 houses a sealing member (not shown) between the winder collar 11 and the sleeve 51 at the sleeve's 51 internal face at the free end portion 50, as shown in FIG. 4.

This provides a significant strength advantage to equipment using the new connection, with no loss of convenience, compared to a standard winder solution.

Figure 6:
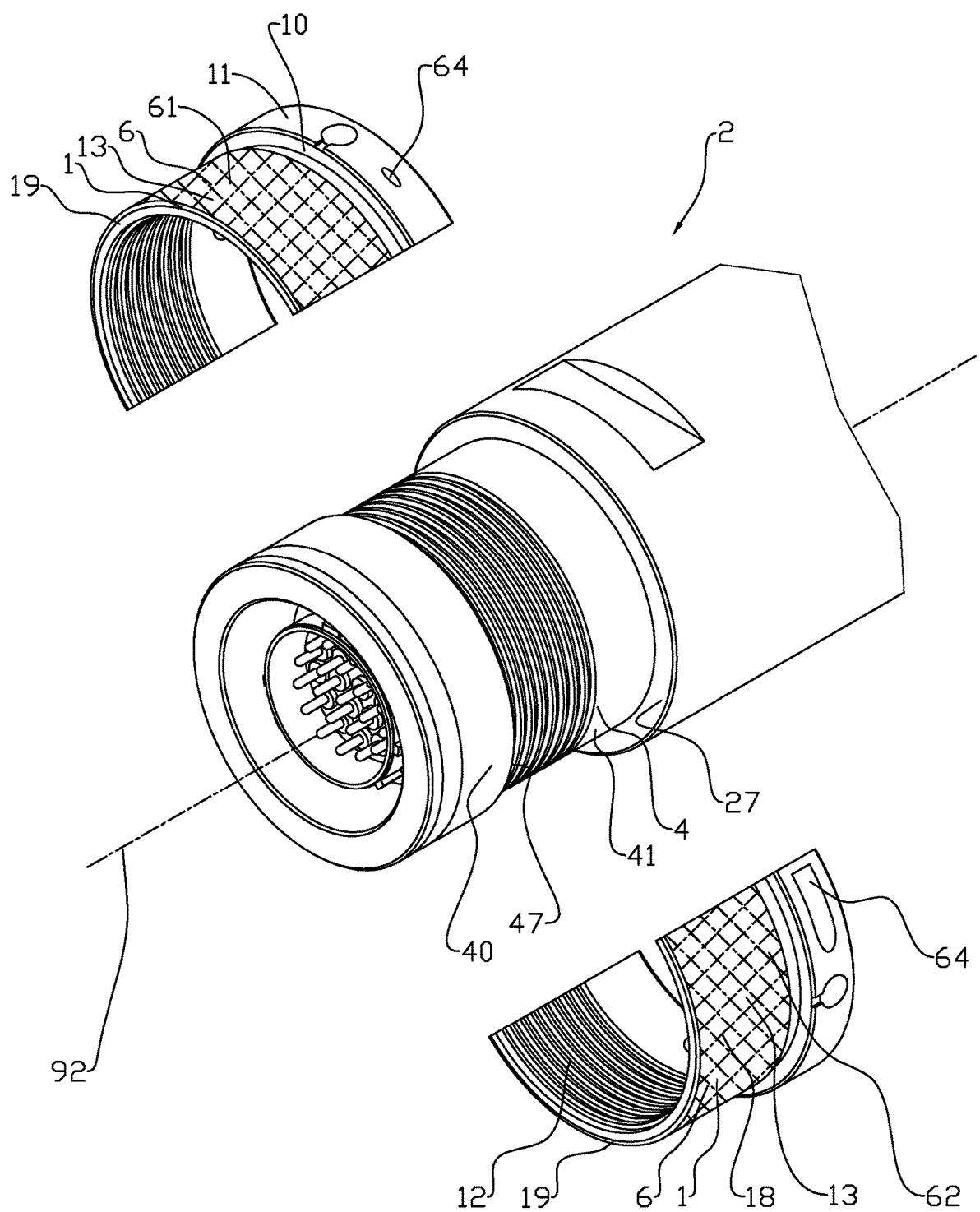
FIG. 6 shows in a different scale an exploded view a winder for an electrical connector according to the invention.
Figure 7:
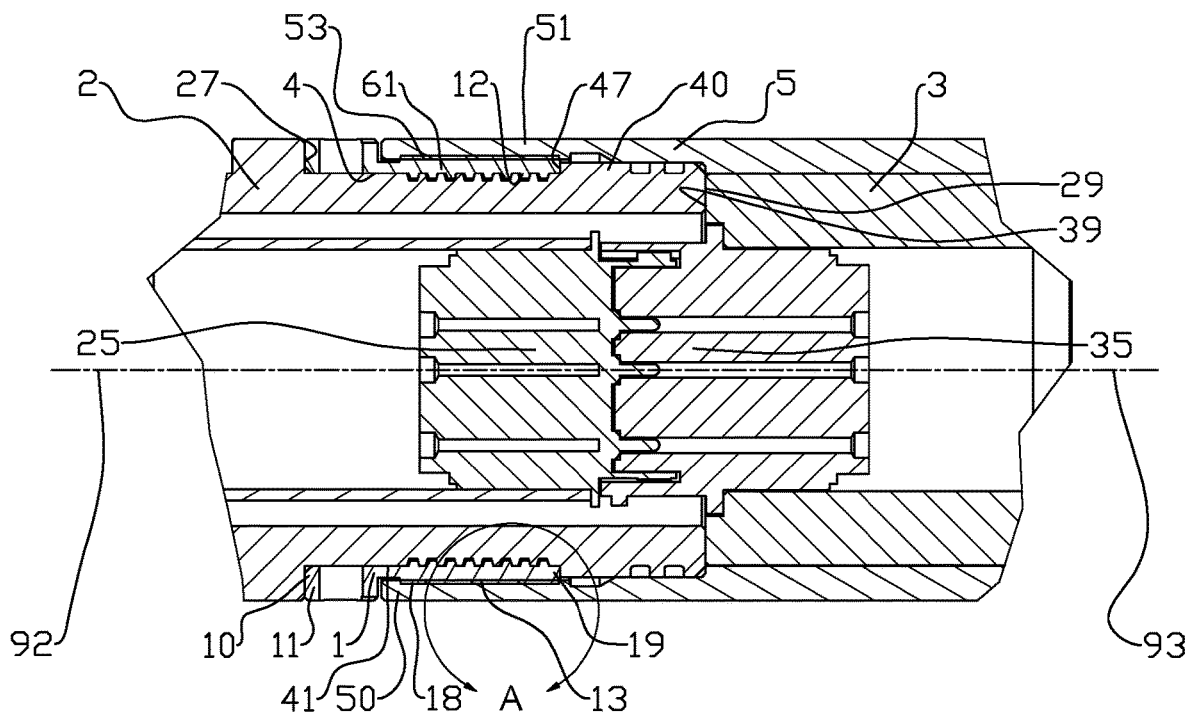
FIG. 7 shows in the same scale as FIG. 2, a sectional drawing of the winder shown in FIG. 6 from a different direction.
Figure 7:
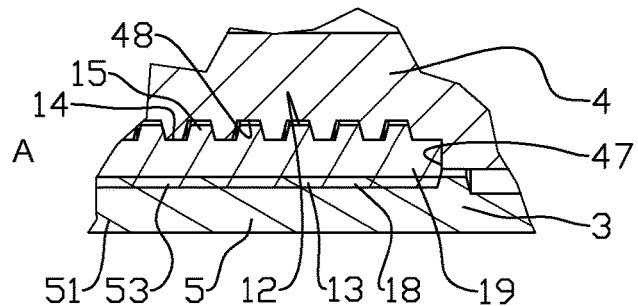

A winder 1 according to an alternative embodiment of the invention is shown in FIGS. 6 and 7. The shown winder 1 is for an electrical connector. The winder 1 is suitable for other types of connectors, such as a hydraulic connector or a combined electrical and hydraulic connector.

The winder 1 comprises a winder collar 11 and a winder ring 6. The winder collar 11 and the winder ring 6 are formed from one piece of material. The winder 1 is a split winder 1 comprising a first segment 61 and a second segment 62 as shown in FIG. 6. The split winder 1 may in embodiments not shown, comprise more than two segments, such as three or four segments. The segments may be of different radial size.

The winder 1 connects two stationary bodies 2 and 3 together by a threaded connection, as shown in FIG. 7. The two bodies 2, 3 may have the same OD or the OD of the first body 2 may be different to the OD of the second body 3. The winder 1 is rotated and this screws the first body 2 into the second body 3 while keeping all electrical connections 2 in the first body 2 aligned with the respective electrical connections 35 in the second body 3.

The end portion of the first body 2 forms a shoulder 27 and a cylindrical male portion 4. A cylindrical face 41 on the male portion 4 is smooth and forms a sliding surface between the winder 1 and the male portion 4. The winder 1 forms a sleeve with a first end portion 10 and a second end portion 19. The first end portion 10 abuts the shoulder 27. The first end portion 10 is provided with a winder collar 11 such that the OD of the first end portion 10 corresponds with the OD of the first body 2.

The male portion 4 is at a free end portion 40 provided with a circular shoulder 47. An axial distance between the shoulder 27 and the shoulder 47 corresponds substantially to the length of the winder 1. The winder's 1 axial position is fixed by the shoulders 27 and 47.

The male portion 4 is further provided with a number of circular, parallel grooves 48 in the cylindrical face 41 between the free end portion 40 and the shoulder 27. In FIG. 7, eight such grooves 48 are shown. Each groove 48 is shown as a tapered groove 48. The grooves 48 may in alternative embodiments be of a V-shape or be of a square shape.

An internal face 12 of the winder ring 6 is provided with a number of internal, circular, parallel grooves 14 that between them forms a number of internal, circular, parallel ridges 15 as shown in the enlarged detail in FIG. 7. The ridges 15 are complementary to the grooves 48 of the male portion 4. A height of the ridges 15 is smaller than a depth of the grooves 48. The winder 1 can freely rotate around the male portion 4 as the grooves 14 and ridges 15 are parallel and perpendicular to the axis 92 of the first body 2 and the axis 93 of the second body 3.

The winder 1 is on an outer face 18 provided with external threads 13 at the second end portion 19. The external threads 13 are shown with an OD that is less than the OD of the first body 2. In an alternative embodiment (not shown), the OD of the external threads are equal to the OD of the first body 2. In a further alternative embodiment, the OD of the external threads are larger than the OD of the first body 2. In these alternative embodiments, there is no shoulder 27 at the end portion of the first body 2.

The end portion of the second body 3 forms a female portion 5 with a fixed sleeve 51. The sleeve 51 is complementary to the male portion 4 inclusive the winder's 1 second end portion 19. The sleeve's 51 free end portion 50 is provided with a smooth internal face. The sleeve 51 is in a middle portion provided with internal threads 53.

The two half segments 61, 62 may in one embodiment be hold together by screws (not shown) in tangential directed screw holes 64 in the two half segments 61, 62.

The make-up process is initiated by axially aligning the first body 2 and the second body 3. The second body 2 is mated with the second body 3 such that the male portion 4 enters the female portion 5 until the external threads 13 abut the internal threads 53. The winder 1 is rotated and the external threads 13 engage the internal threads 53. The winder 1 is rotated until a mating face 29 of the male portion 4 abuts a mating face 39 of the female portion 5.

As seen in FIG. 7 a tensile load is distributed over the ridges between the grooves 48. In the shown embodiment there is eight grooves 48. Instead of the tensile forces being supported by just one small shoulder 47A as in the prior art shown in FIG. 3, the new connection has a multitude of supporting shoulders, making the connection many times stronger as shown in FIG. 7, and of the same level of tensile performance as the external threaded connection 13, 53, and despite the fact that the connection takes up no more valuable space than the prior art.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A winder for a threaded connection of two axially aligned bodies wherein a first body comprises a male portion at an end connection portion; a second body comprises a female portion at an end connection portion, said male portion comprises a number of circular, parallel grooves in a cylindrical face; the female portion comprises a fixed sleeve with a threaded portion on an internal face; said winder comprising:

a winder ring positioned on and encircling the male portion and freely rotating around the male portion; and the winder ring forms an internal surface and an external surface, and the external surface comprises a threaded portion, the internal surface of the winder ring comprises a number of parallel grooves that are perpendicular to a rotational axis of the winder ring; and said parallel grooves form between them a number of internal, circular, parallel ridges, said parallel ridges are formed with a clearance to the parallel grooves of the male portion.

2. The winder according to claim 1, wherein the winder ring is formed by two or more segments.

3. The winder according to claim 1, wherein the winder further comprises a winder collar.

4. The winder according to claim 3, wherein the winder ring and the winder collar are permanently fixed together.

5. The winder according to claim 3, wherein the winder collar is releasably joined to the winder ring.

6. A male portion for a threaded connection at an end connection portion of a first body, the male portion is adapted to be mated with a female portion at an end connection of a second body, wherein the female portion comprises a fixed sleeve with a threaded portion on an internal face; and a winder comprises a winder ring, said winder ring is positioned on and encircling the male portion and freely rotating around the male portion; the winder ring forms an internal surface and an external surface, and the external surface comprises a threaded portion, said internal surface comprises a number of parallel grooves that are perpendicular to a rotational axis of the winder ring; and said parallel grooves form between them a number of internal, circular, parallel ridges; the male portion comprising:

an outer surface including a number of parallel grooves that are perpendicular to a longitudinal axis of the first body, said grooves are complementary to the ridges of the winder ring.

7. The male portion according to claim 6, wherein the male portion has an outer diameter that is less than the outer diameter of the first body.

8. A threaded connection between two axially aligned bodies, said connection comprising:

a first body which comprises a male portion at an end connection portion;

a second body which comprises a female portion at an end connection portion, the female portion comprises a fixed sleeve with a threaded portion on an internal face;

a winder which comprises a winder ring positioned on and encircling the male portion and freely rotating around the male portion, the winder ring forms an internal surface and an external surface, and the external surface comprises a threaded portion;

the winder ring's internal surface comprises a number of parallel ridges that are perpendicular to a rotational axis of the winder ring; and the male portion at an outer surface comprises a number of parallel grooves that are perpendicular to a longitudinal axis of the first body, and the parallel ridges of the winder ring mate with the male portion's grooves.

9. The threaded connection according to claim 8, where the winder ring is formed by two or more segments.

* * * * *